W. C. BURRIS.
VEHICLE BODY HOLDER.
APPLICATION FILED APR. 16, 1908.
909,845.
Patented Jan. 12, 1909.
3 SHEETS—SHEET 1.
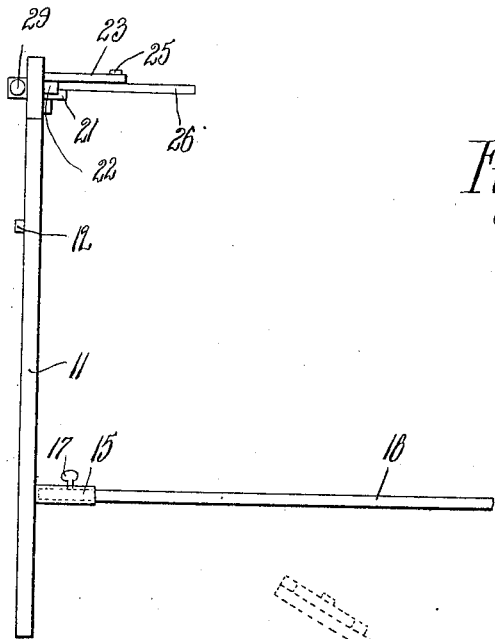
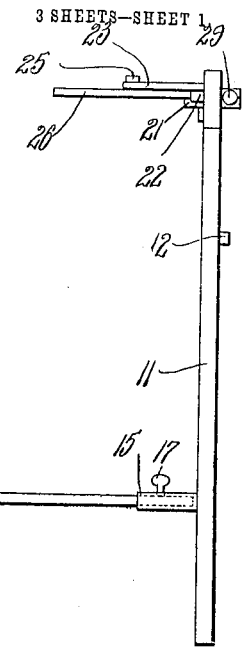
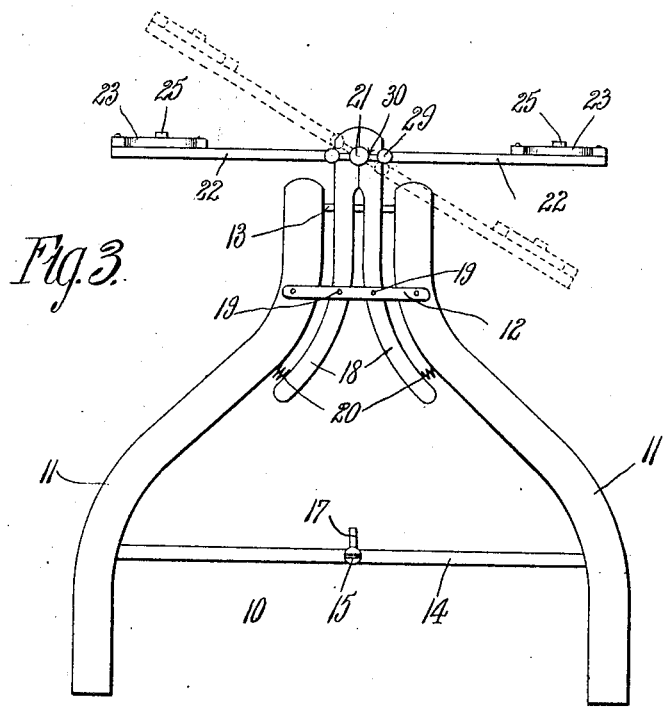
Witnesses
J. H. Crawford
Inventor
William C. Burris,
By Chandlee & Chandlee
Attorneys

W. C. BURRIS.
VEHICLE BODY HOLDER.
APPLICATION FILED APR. 16, 1908.

909,845.

Patented Jan. 12, 1909.

3 SHEETS—SHEET 2.

Witnesses
J. H. Crawford

Inventor
William C. Burris,
By Chandler & Chandler
Attorneys

W. C. BURRIS.
VEHICLE BODY HOLDER.
APPLICATION FILED APR. 16, 1908.
909,845.
Patented Jan. 12, 1909.
3 SHEETS—SHEET 3.
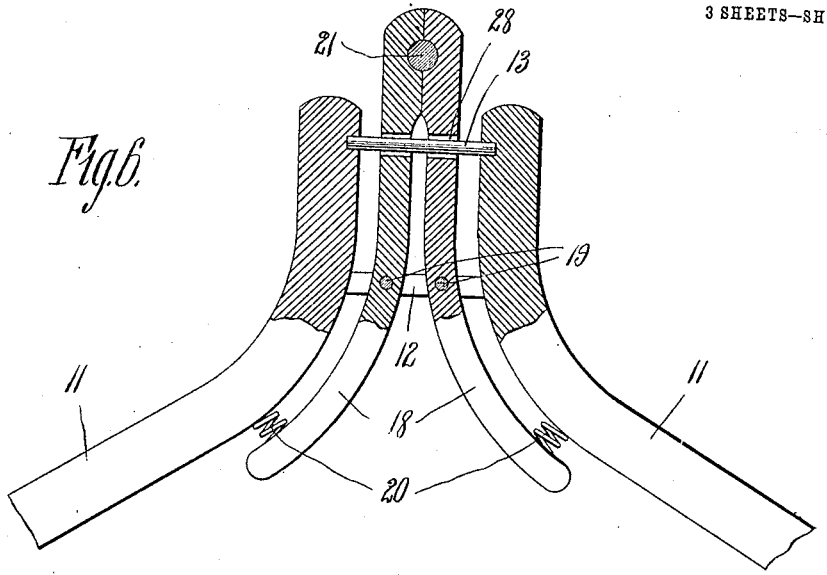
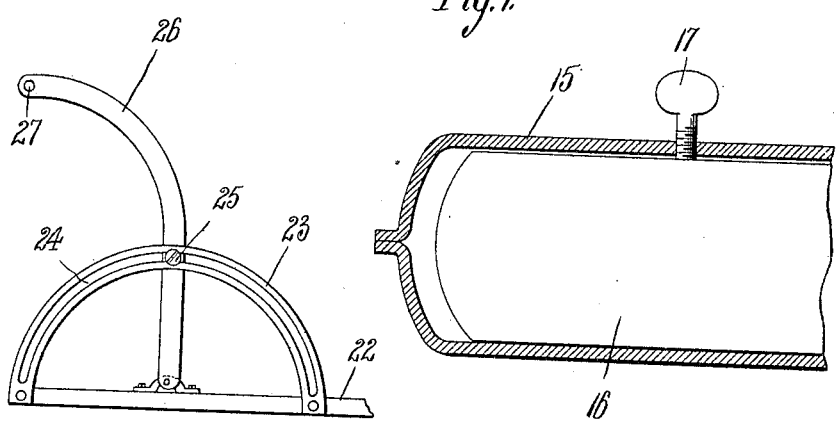
Witnesses
J. H. Crawford,
Inventor
William C. Burris,
By
Attorneys

UNITED STATES PATENT OFFICE.

WILLIAM C. BURRIS, OF CLARKSBURG, OHIO, ASSIGNOR OF ONE-HALF TO MARY E. DAWSON, OF CLARKSBURG, OHIO.

VEHICLE-BODY HOLDER.

No. 909,845.  Specification of Letters Patent.  Patented Jan. 12, 1909.

Application filed April 16, 1908. Serial No. 427,503.

*To all whom it may concern:*

Be it known that I, WILLIAM C. BURRIS, a citizen of the United States, residing at Clarksburg, in the county of Ross, State of Ohio, have invented certain new and useful Improvements in Vehicle-Body Holders; and I do hereby declare the following to be a full, clear, and exact description of the invention, such as will enable others skilled in the art to which it appertains to make and use the same.

This invention relates to new and useful improvements in vehicle body holders and it has more particular reference to an apparatus for sustaining vehicle bodies in elevated positions and at selected angles during such operations as cleaning, painting or the like.

In connection with an apparatus of the above general character, the invention aims as a primary object to provide a novel construction, combination and arrangement of parts, the details of which will appear in the course of the following description in which reference is had to the accompanying drawings forming a part of this specification, like characters of reference designating similar parts throughout the several views, wherein:—

Figure 2:
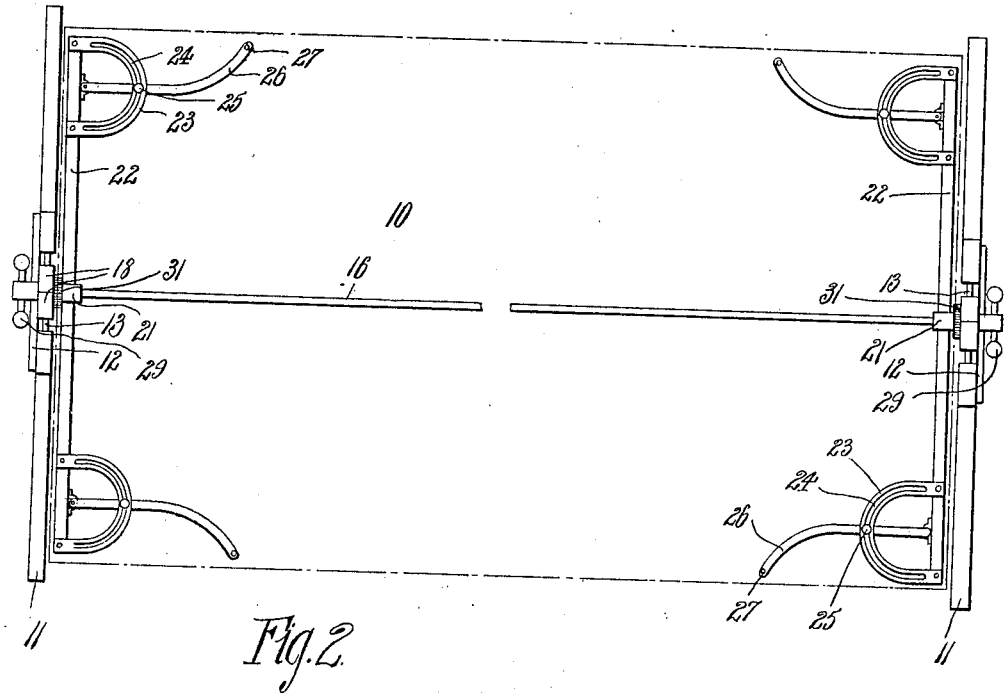
Figure 4:
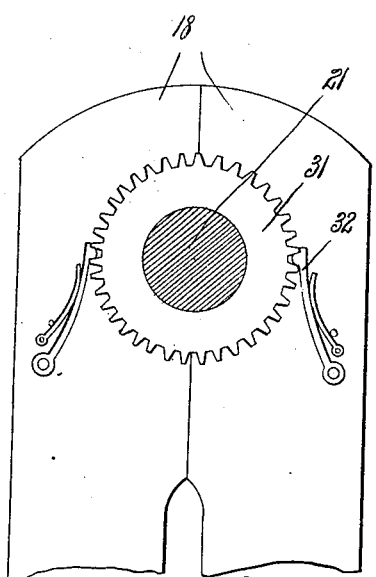

Figure 1 is a side elevation showing the manner of use of the apparatus embodied in the present invention, Fig. 2 is a top plan view of such apparatus, the wagon body being indicated by dotted lines, Fig. 3 is an end elevation thereof showing by dotted lines the manner of inclining the supported body to varying angles, Fig. 4 is an enlarged cross sectional view showing a ratchet and reversible pawls included in the invention, Fig. 5 is an enlarged view showing an adjustable arm embodied in the invention, Fig. 6 is a detailed sectional view showing an adjustable connection for the ends of a longitudinal frame bar, and, Fig. 7 is an enlarged detailed transverse sectional view through one end of the apparatus.

In the accompanying drawings, the numeral 10 designates a supporting frame including curved end standards 11 converging toward their upper ends and united by spaced parallel straps 12 and cross braces 13. At their lower ends the standards 11 have connection with straps 14, the latter in turn supporting centrally located socket members 15 in which are adjustably received the ends of a longitudinal connecting rod 16, the latter being adjustably movable with relation to the sockets 15 and being held by the frictional action of set screws 17 threaded through said sockets. The rod 16 thus serves as the mainstay of the frame 10 and the provision of the adjustable connections (constituted of the sockets 15) affords a means whereby the frame may be made longer or shorter to accommodate correspondingly proportioned vehicle bodies.

Opposed members 18 curved in conformity to the upper ends of the standards 11 are held pivotally between the straps 14 by means of pins 19, the lower ends of the members 18 being held by retractile springs 20 so that their upper ends abut, the springs 20 bearing against the standards 11. The abutting upper ends of the opposing members 18 are formed to constitute bearings for short length shafts 21 located at each end of the frame 10 and carrying oppositely disposed radially projecting alined arms 22 upon the ends of which curved members 23 are provided. The members 23 are of semi-circular form and are each provided with an arcuate slot 24 through which projects the headed guide pin 25 of an arm 26, the latter being pivoted to each of the arms 22. The heads of the guide pins 25 carry set nuts 25' which frictionally bind upon the members 23 and by means of which the arms 26 may be set at selected angles in accordance with the width of the body. The arms 26 are of curved formation and are designed for adjustable movement in the plane of the arms 22 for connection to the frame of the vehicle body, and the free end having apertures 27 through which fastening means may be engaged. The opposing members 18 are provided with registering openings 28 through which the cross braces 13 at each end of the frame pass.

The shafts 21 are rotated to set the arms 22 at selected inclinations whereby the angle of the body may be varied by means of handle members 29 on the outer ends of said shafts. For the purpose of holding said shafts against rotary movement under the weight of the body said shafts carry ratchet wheels 31 with which pivoted spring pressed pawls 32 mounted in opposed reversible relation upon the respective pairs of opposing members 18, are designed to engage.

It will be readily apparent that by manually forcing the members 18 apart on their pivots against the tension of the springs 20, the shafts 21 and the adjunctive elements carried thereby may be readily removed from between the upper ends of said members. The apparatus as a whole may thus be readily assembled and disassembled and the frame is of such form that it may be crated conveniently for shipping and without occupying much space.

What is claimed, is—

1. An apparatus of the type set forth comprising a frame including end standards arranged in connected pairs, spring held members pivoted to each of said standards and arranged in pairs at each end of the frame, the respective pairs of said members being constructed as bearings at their upper ends, shafts journaled in the said upper ends and disposed at each end of the frame, and wagon body supporting devices carried by said shafts.

2. An apparatus of the type set forth comprising a supporting frame, shafts journaled at the ends thereof, wagon body supporting devices carried by said shafts, ratchet wheels carried by said shafts, and spring pressed pawls mounted at each end of said frame in pairs and in opposed relation for coöperation with said ratchet wheels.

3. An apparatus of the class described comprising a pair of spaced end sections adjustably connected to each other, clamping members pivotally supported by said end sections, supporting means having journals mounted in said clamping members, outwardly curved arms pivoted to said supporting means, and means for holding the arms in adjusted position.

4. An apparatus of the class described comprising a pair of spaced end sections adjustably connected to each other, clamping members pivotally supported by said end sections, supporting means having journals mounted in said clamping members, outwardly curved arms pivoted to said supporting means, means for holding the arms in adjusted position, and means for turning said supporting means.

5. An apparatus of the class described comprising a pair of spaced end sections adjustably connected to each other, clamping members pivotally supported by said end sections, supporting means having journals mounted in said clamping members, outwardly curved arms pivoted to said supporting means, means for holding the arms in adjusted position, means for turning said supporting means, and means for holding said supporting means in various adjusted positions.

In testimony whereof, I affix my signature, in presence of two witnesses.

WILLIAM C. BURRIS.

Witnesses:
O. Z. DAWSON,
MARY E. DAWSON.